United States Patent [19]

Gutiérrez-Villarreal

[11] Patent Number: 5,756,577
[45] Date of Patent: May 26, 1998

[54] STYRENE BUTADIENE COPOLYMER AND POLYOLEFIN RESINS BASED SHRINK FILMS

[75] Inventor: Mario Humberto Gutiérrez-Villarreal, Monterrey, Mexico

[73] Assignee: Grupo Cydsa, S.A. de C.V., Garza Garcia, Mexico

[21] Appl. No.: 614,598

[22] Filed: Mar. 21, 1996

Related U.S. Application Data

[60] Provisional application No. 60/008,830, Dec. 18, 1995.

[30] Foreign Application Priority Data

Mar. 27, 1995 [MX] Mexico ................. 951520

[51] Int. Cl.$^6$ ........................ B65B 53/00
[52] U.S. Cl. ............... 525/88; 525/98; 525/240; 525/241; 525/232; 428/35.1; 428/910
[58] Field of Search .............. 525/88, 89, 240, 525/241, 232; 428/34.9, 35.1, 915, 910, 195, 200, 515; 156/DIG. 1, DIG. 2, DIG. 4, DIG. 15, DIG. 29, DIG. 34, DIG. 35, DIG. 36, DIG. 33; 283/81

[56] References Cited

U.S. PATENT DOCUMENTS

| | | | |
|---|---|---|---|
| 3,294,868 | 12/1966 | Pritchard | 260/876 |
| 3,459,831 | 8/1969 | Luftglass et al. | 260/876 |
| 4,386,125 | 5/1983 | Shiraki et al. | 428/36 |
| 4,463,861 | 8/1984 | Tsubone et al. | 215/12 R |
| 4,495,323 | 1/1985 | Collins | 524/426 |
| 4,500,666 | 2/1985 | Wada | 524/232 |
| 4,574,134 | 3/1986 | Willcox et al. | 524/157 |
| 4,582,871 | 4/1986 | Noro et al. | 524/413 |
| 4,619,959 | 10/1986 | Matsubara et al. | 524/228 |
| 4,647,621 | 3/1987 | Pohrt et al. | 525/71 |
| 4,814,364 | 3/1989 | Yoshizaki et al. | 523/100 |
| 4,835,041 | 5/1989 | Tsukamoto et al. | 428/215 |
| 5,036,130 | 7/1991 | Walter et al. | 524/505 |
| 5,319,033 | 6/1994 | Trepka et al. | 525/314 |
| 5,411,777 | 5/1995 | Steele et al. | 425/349 |
| 5,466,499 | 11/1995 | Takagi et al. | 428/36.9 |

FOREIGN PATENT DOCUMENTS

| | | |
|---|---|---|
| 57-25349 | 2/1982 | Japan. |
| 60-6414 | 1/1985 | Japan. |
| 61-25834 | 2/1986 | Japan. |
| 2-206529 | 8/1990 | Japan. |
| 3-146331 | 6/1991 | Japan. |

*Primary Examiner*—Paul J. Thibodeau
*Assistant Examiner*—D. Lawrence Tarazano
*Attorney, Agent, or Firm*—Shlesinger, Arkwright & Garvey LLP

[57] ABSTRACT

This invention is related to the production and application of heat-shrinkable films derived from a mixture of styrene-butadiene copolymer and polyolefin type resins produced by any of the known processes for polymeric films production. Thermal and mechanical properties of the films derived from this invention makes them suitable to be used, among other applications and with no restriction to the field of this invention, in heat-shrinkable labels, safety seals and overwrap type packaging, blister type thermoformed packaging and in general terms for any kind of packaging, overwrap safety packaging such as the employed to pack audiocassettes, videocassettes, books, magazines, etc., to protect them from tampering, as well as in general applications for packaging material.

19 Claims, 1 Drawing Sheet

SHRINKING OF A 2 MILS FILM ON
SILICON OIL FOR 10 SEC.

SHRINKING OF A 2 MILS FILM ON SILICON OIL FOR 10 SEC.

STYRENE BUTADIENE COPOLYMER AND POLYOLEFIN RESINS BASED SHRINK FILMS

This application claims the benefit of U.S. Provisional Application No. 60/008,830, filed Dec. 18, 1995.

FIELD OF THE INVENTION

This invention is related to the production of a heat-shrinkable film produced from a blend of styrene—butadiene copolymers and polyolefine type resins, which thermal and mechanical properties make them suitable for use in heat-shrinkable labels for any kind of containers. It also can be used for the production of safety seals for pharmaceutical, medical, cosmetic and food products as overwrap safety packaging such as the employed to pack audiocassettes, videocassettes, books, magazines, etc., to protect them from tampering, as well as in general applications for packaging material.

DESCRIPTION OF THE PREVIOUS ART

In the past and even today, a polyvinylchloride (PVC) monoaxial or biaxial oriented shrinkable film has been used as packaging material for the production of heat-shrinkable labels in glass bottles, as well as for safety seals in different applications. The production process for this kind of films varies widely, with or without plastifying materials. However, this material has several disadvantages, among others: its low transparency and machinability, the fact that the film looks like an exudated film due to the migration of additives, but the main disadvantages are environmental, health and safety related, since during its production some vinyl chloride is present in the gaseous effluents; during its application, the presence of vinyl chloride's residual monomers makes this material unsuitable for food packaging; and during the final disposition of the PVC film, where the only alternative economically feasible, is the incineration as waste material, thus generating toxic and corrosive gases, such as chlorine and hydrochloric acid.

Other materials commonly used in labels for containers are laminates from polypropylene and paper. This kind of materials has multiple disadvantages since they are not heat-shrinkable, and that during its application to the containers it is required the use of adhesives and furthermore, they could easily detach, leaving the container without identification. It also has been used bioriented polypropylene films (BOPP) even though these films have a limited shrinkage.

On the other hand, there are previous works related to the production of shrinkable films from styrene based resins and blends with copolymers of styrene-butadiene. Luftglass and Hendricks (U.S. Pat. No. 3,459,831) teach the use or polyethylene and elastomeric block copolymers to produce films than can be used as packaging material with improved properties of resistance to oxidation, weathering, ozone and solvents than the polyethylene alone, but he does not teach the use of the film as a heat-shrinkable label. Shiraki et al. (U.S. Pat. No. 4,386,125) describes the use of a highly oriented styrene-butadiene block copolymers with a shrink factor at 80° C. of not less than 15% in at least one direction and a tensile modulus of not less than 7,000 Kg/cm$^2$. When the films of these materials are extruded with monoaxial elongation in transversal direction, there always will be elongation in machine direction, causing cracks and failures in the film, affecting the visual appearance of the label and having a low impact resistance. To overcome these problems, it was proposed a bioriented film in conditions such that allow the preset shrinkage both transversal and longitudinal to control the mechanical properties of the resulting film and the number and time of appearance of failures in the film (JP 60-6414). There are also records for production jobs of shrinkable films from polystyrene mixed with styrene-butadiene copolymers, where it has been added a plastifier material to the blend to keep stable the film concerning natural shrinkage at room temperature during long storage periods and allowing shrinkage at lower process temperatures, as compared with other films of the same material but without plasticizers (JP 2-206529).

It also has been reported a heat-shrinkable film from a blend of styrene-butadiene copolymer resins and one styrene matrix. This styrene matrix is a no continuous dispersed phase of particles of a styrene homopolymer with an average size of 0.1 to 0.7 microns, encapsulated in a thin film produced when orienting a styrene-butadiene copolymer block, with molecules of type (SB)n-S styrene, where n is larger than 2 and with a thickness not exceeding a quarter of the average of the diameter of the particles. With the blend of these resins, after blowing and giving them a monoaxial elongation in the machine direction, it can be produced a heat-shrinkable film, with an excellent resistance to tension produced cracks, that are suitable for use in labels for plastic and glass bottles. (JP 3-1 46331).

Other works oriented to the same shrinkable film applications for the production of labels were reported in the patent number (JP 61-25834) where a film is produced with two laminated layers, one of such layers is made from expandable foam resin, obtained from a blend of styrene resin and olefinic resins such as polyethylene or polypropylene and one elastomer of the stryene-butadiene copolymer type, this layer is laminated with other film, mainly made from a copolymer resin of the styrene-butadiene type. This structure presents the advantages of improved shrinkage, better resistance to creases and a better resistance to solvents and oils; however, since foaming film can not be reverse-printed, printing tends to deteriorate with the usage and handling of the bottle.

This invention is related with the production of heat-shrinkable films produced from blends of stryene-butadiene copolymer and polyolefine resins, which thermal and mechanical properties make them suitable for solving the problems inherent to PVC and styrene-butadiene copolymer's shrinkable films currently known and used.

OBJECTIVES OF THE INVENTION

Therefore, the main objective of this invention is to provide an extruded or coextruded heat-shrinkable cast film, of one or more layers, and preferably only one layer that avoids the related environmental problems experienced by PVC resin films, since our material can be recycled or incinerated without affecting the environment with toxic gases.

It is also the objective of our invention to produce one heat-shrinkable film with resistance to oils, differing from those polystyrene based films having low resistance to them, and to produce heat-shrinkable labels that are sealed using solvents such as toluene, tetrahydrofurane (THF), ethyl acetate, xylene, dimethylformamide (DMF), etc., in the proper glass bottle labeling machines or equipment designed for placing safety seals avoiding the use of adhesives or Hot Melts used in the sealing of paper labels or laminations from PP-Paper, reducing costs and simplifying manufacturing processes.

Other feature of our invention is that our film is formulated to keep stable its shrinking properties while stored at room temperature and humidity conditions with no need to use plastifying agents such as those required in JP 2-206529.

Other of the advantages of our heat-shrinkable film, subject of our invention, as compared with foaming polystyrene film is regarding to the printing process, by having an improved ink retention, better printing quality and better resistance to wearing and ink loss caused by friction and handling during the storage and packaging processes.

One further advantage of our invention is that it does not require a different styrene matrix which encapsulated particles as required in JP 3-14631. Our invention requires a blend of a material more readily available in the market polyolefin.

These and other objectives and advantages of this invention, will be evident to experts in the field, from the following detailed description.

DETAILED DESCRIPTION OF THE INVENTION

This invention regards to the production and applications of heat-shrinkable films produced from a blend of styrene-butadiene copolymer resins and polyolefines.

Styrene-butadiene copolymer resins are made from a resin where the content of the second comonomer is in the order of 1 to 30 mol % and preferably in the order of 20 to 25 mol %. The stryene-butadiene copolymer resin is selected from the K Resin Grade 03, 04, 05, 10 made by Phillips Petroleum Co. or any other or similar resin from any other producer.

The resin of polyolefine can be selected from one or more of the following types: very low molecular weight polyethylene (VLMWPE), low molecular weight polyethylene (LMWPE), high molecular weight polyethylene (HMWPE), medium density polyethylene (MDPE), linear low density polyethylene (LLDPE), very low density polyethylene (VLDPE), low density polyethylene (LDPE), ultra low density polyethylene (ULDPE), high density polyethylene (HDPE), copolymers of ethylene (PE) with ethylene vinyl acetate (EVA), ethylene methyl acrylate (EMA), ethylene acrylic acid (EAA) or a mix of them. The resin can also include any other olefinic material, like polypropylene and their copolymers and terpolymers, linear or branched; butadiene type elastomers and their copolymers, linear or branched; isoprene and their copolymers, linear or branched; ethylene-butene, ethylene-hexene, ethylene-octene copolymers and the alike, or its mixtures. These resins can be added in an amount less than 50% of weight, and preferably between 10 and 15% in weight, single or as a master batch resin acting as carrier for pigments, antiblocking agents, slip agents, coloring agents, antioxidants, ultraviolet light absorbers, fillers or any other type of additives. In the case of pigmentation, this can be white Or any other color, where the white color can be produced by the presence of titanium oxide, zinc oxide, magnesium oxide, cadmium oxide, zinc chloride, calcium carbonate, magnesium carbonate, etc., or any combination of them in the amount of 0.1–20% in weight, depending on the white pigment to be used, and the colored pigment can be produced by carbon black, phtalocianine blue, congo red, titanium yellow or any other coloring agent known in the printing industry. Some other additives are added depending on the application, being one of them the antiblocking agent that usually is silicon oxide, either natural or synthetic, or also organic type antiblocking agents, in amounts which fluctuate from 0.1 to 2% in weight, antistatic agents from 0.01 to 2% in weight, lubricants from 0.1 to 2% in weight flame retardants from 0.01 to 1% in weight, ultraviolet light absorbers from 0.1 to 1%, antioxidants from 0.1 to 1% in weight, etc. The above compositions are expressed as percent of the total weight of the polymer blend.

Fillers such as talc, silica, alumina, calcium carbonate, barium sulfate, metallic powder, glass spheres, fiberglass, can be incorporated to the blend in order to reduce cost or to add some properties to the film, in an amount less than 10% of the total weight of the polymer blend, inasmuch as does not alter the shrinking properties with the temperature, for the purpose the film was designed.

During its production it is recommended to control the temperatures of the extruding or coextruding process to avoid degradation and to control the residence time of the resin inside the equipment. A set of operating conditions is presented in the example below, without limiting the field of the invention.

During its production, the film can get a corona treatment, or any other mean, (flame, chemical or plasma treatment) to give its surface the capability to be printed by techniques of flexography, rotogravure, or any other known technique in the printing industry.

The film achieved by these means is thermoformed and shrinkable where exposed to temperatures between 100° and 160° C., either by radiation, hot air, hot water or hot oil, achieving shrinking values in the order of 1–60% depending on the time and temperature applied. These shrinking features make them specially useful to be used in labels in any kind of bottles, safety seals, blisters, overwrap packaging and overwrap safety. Packaging such as those employed to pack audiocassettes, videocassettes, books, magazines, etc., to protect them from tampering.

This invention will now be explained in a more detailed form, through the following practical examples.

PRACTICAL EXAMPLES

EXAMPLE 1

Figure 1:
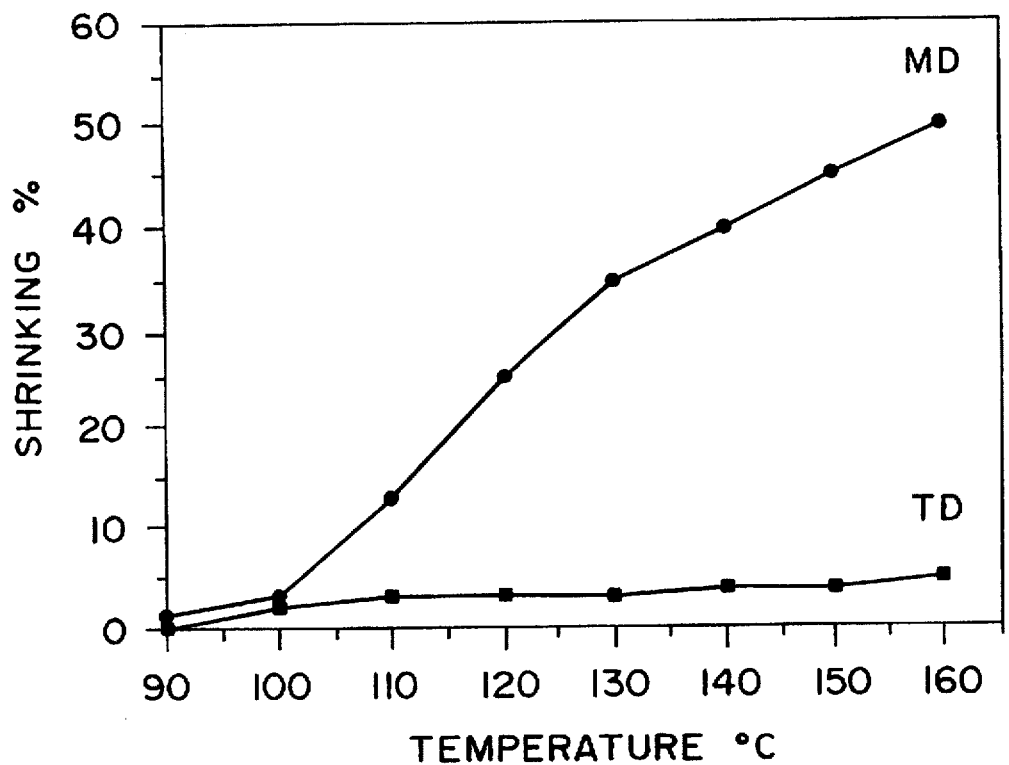
FIG. 1 shows the shrink properties of film having a thickness of 2 mils.

Following is a typical formulation for the production of a monolayer cast film in an extruder equipment with a T die, the equipment is a Blaick Clawson, Egan or equivalent.

Phillips Petroleum Co. K Resin (stryene-butadiene copolymer) Grade 03 (MFI=8.0, Density 1.01), is used to produce the film in a proportion of 85% in weight, mixed with a 13% in weight of a master batch which in turn contains 57% of low density polyethylene resin ( MFI=22 ), 50% in weight of a white pigment of titanium dioxide and 3% of silica as antiblocking agent to give the desired optical density in the final product and 2% of High Impact Polystyrene (HIPSHF-777-220 from Resistol) as antiblocking. The above mentioned components can be previously mixed in a traditional mixer before feeding them to the extruding equipment.

For the extruding process, the following temperatures are recommended: Feeding zone 1 : 175° C. to 195° C. and from Zone 2 to Zone 5: under 195° C. to 205° C., the melting temperature not to be over 212° C., the temperature of the die in any of its zones not to be over 204° C. and finally, the temperature of the Chill Roll can fluctuate in the range from 42° C. to 85° C. Line speed was 70 meters per minute, being able to reach a speed of 120 meters per minute. During the extruding process, the film received a corona treatment at a level of 40 dynes, to give to its surface the property to be printed.

Thermal and mechanical properties of the film produced in this example No. 1 are as follows: (the values given are the average of three measurements. 10% of tolerance can be considered)

| Film thickness | 2.2–2.4 mils | |
|---|---|---|
| Yield (gm/sq. meter) | 59 | |
| Ultimate Tensile Strength | | |
| (UTS) (Kg/cm$^2$) | | |
| Machine Direction (MD) | 260 | ASTM D882 |
| Transversal Direction (TD) | 222 | |
| Elastic Limit (%) | | |
| MD | 278 | ASTM D882 |
| TD | 156 | |
| Elongation (%) | | |
| MD | 392 | ASTM D882 |
| TD | 292 | |
| Shrinking (%) | | |
| MD | 35.0 | Oil, 130° C., 10 sec. |
| TD | 2.5 | |
| Optical Density (Macbeth Units) | 0.59 | |
| Coefficient of Friction (Dimensionless) | | |
| Treated Face (TF) | 0.23 | |
| Non Treated Face (NTF) | 0.21 | |

Shrinking behavior of a 2 mil thickness film is shown on FIG. 1.

Without being limitative the polyolefin resins evaluated in the following practical examples 2-12 are presented in Table 1.

TABLE 1

OTHER RESINS EVALUATED ON THIS WORK

| NAME | RESIN | SUPLIER | MFI | DENSITY |
|---|---|---|---|---|
| a.) PX22004 | LDPE | PEMEX | 0.4 | 0.92 |
| b.) Attane 4203 | LLDPE | DOW | 0.8 | 0.91 |
| c.) PX20020-P | LDPE | PEMEX | 2 | 0.92 |
| d.) Attane 4202 | LLDPE | DOW | 3.2 | 0.91 |
| e.) PX65050 | HDPE | PEMEX | 5 | 0.97 |
| f.) PX17070-L | LDPE | PEMEX | 7 | 0.91 |
| g.) PX60120 | HDPE | PEMEX | 12 | 0.96 |
| h.) Profax 6631 | PP | INDELPRO | 1.9 | 0.90 |
| i.) Profax 6532 | PP | INDELPRO | 3 | 0.90 |
| j.) Z9470 | PP (copolymer) | FINA | 5 | 0.91 |
| k.) Valtec HSO12 | PP | INDELPRO | 9 | 0.90 |

EXAMPLES 2–4

Example 1 was repeated except for the following:

Blends of three different LDPE, blends a, c, and f (MFI= 0.4, 2.0 and 7.0 respectively) with styrene-butadiene copolymer K-03 were evaluated at different weight percent ratio keeping antiblock and slip additives constant, no pigments were added to these blends. Shrinking and Tensile strength properties of these samples are reported on Table 2 and 6 respectively.

TABLE 2

SHRINKING OF 2 MIL FILMS AT 130° C./10 SEC, AT DIFFERENT COMPOSITION OF POLYOLEFIN

| RESIN | 5% | | 10% | | 15% | | 20% | | 30% | |
|---|---|---|---|---|---|---|---|---|---|---|
| LDPE | MD | TD | MD | TD | MD | TD | MD | TD | MD | TD |
| a | 44.0 | 2.0 | 43.0 | 0.0 | 41.0 | 5.0 | 44.0 | 2.0 | 50.0 | 1.5 |
| c | 42.0 | 2.0 | 41.0 | 1.0 | 43.0 | 2.0 | 45.0 | 4.0 | 46.0 | 3.5 |
| f | 42.0 | 2.5 | 39.0 | 3.0 | 44.5 | 5.0 | 45.5 | 6.0 | 48.0 | 5.5 |

TABLE 3

SHRINKING OF 2 MIL FILMS AT 130° C./10 SEC, AT DIFFERENT COMPOSITION OF POLYOLEFIN

| RESIN | 5% | | 10% | | 15% | | 20% | | 30% | |
|---|---|---|---|---|---|---|---|---|---|---|
| LLDPE | MD | TD | MD | TD | MD | TD | MD | TD | MD | TD |
| b | 41.0 | 1.5 | 43.0 | 0.5 | 45.0 | 4.0 | 46.0 | 4.5 | 54.0 | 8.5 |
| d | 43.0 | 1.5 | 41.0 | 1.0 | 38.0 | 3.5 | 45.0 | 6.0 | 52.0 | 5.0 |

TABLE 4

SHRINKING OF 2 MIL FILMS AT 130° C./10 SEC, AT DIFFERENT COMPOSITION OF POLYOLEFIN

| RESIN | 5% | | 10% | | 15% | | 20% | | 30% | |
|---|---|---|---|---|---|---|---|---|---|---|
| HDPE | MD | TD | MD | TD | MD | TD | MD | TD | MD | TD |
| e | 32.0 | 7.0 | 22.0 | 9.0 | 16.5 | 7.5 | 15.0 | 7.0 | 9.0 | 5.0 |
| g | 36.5 | 7.0 | 23.0 | 10.0 | 20.0 | 12.0 | 19.0 | 8.0 | 13.5 | 7.0 |

TABLE 5

SHRINKING OF 2 MIL FILMS AT 130° C./10 SEC, AT DIFFERENT COMPOSITION OF POLYOLEFIN

| RESIN | 5% | | 10% | | 15% | | 20% | | 30% | |
|---|---|---|---|---|---|---|---|---|---|---|
| PP | MD | TD | MD | TD | MD | TD | MD | TD | MD | TD |
| h | 33.0 | 6.0 | 15.0 | 8.0 | 14.5 | 8.5 | 11.5 | 7.5 | 8.0 | 5.5 |
| i | 29.5 | 8.5 | 17.0 | 8.0 | 14.5 | 9.5 | 10.0 | 7.5 | 8.0 | 5.5 |
| j | 42.0 | 2.5 | 41.0 | 1.0 | 45.0 | 2.5 | 43.0 | 8.5 | 42.0 | 4.6 |
| k | 27.5 | 8.5 | 18.0 | 8.0 | 16.0 | 7.5 | 9.0 | 7.5 | 8.5 | 4.5 |

TABLE 6

TENSILE STRENGTH (Kg/cm2) OF 2 MIL FILMS AT DIFFERENT COMPOSITION OF POLYOLEFIN

| RESIN | 5% | | 10% | | 15% | | 20% | | 30% | |
|---|---|---|---|---|---|---|---|---|---|---|
| LDPE | MD | TD | MD | TD | MD | TD | MD | TD | MD | TD |
| a | 263.5 | 186.0 | 271.0 | 155.0 | 271.3 | 193.7 | 240.3 | 147.2 | 193.8 | 85.3 |
| c | 294.5 | 193.8 | 322.0 | 186.0 | 279.0 | 186.0 | 255.8 | 147.2 | 248.0 | 163.0 |
| f | 255.8 | 209.3 | 407.0 | 194.0 | 263.5 | 116.3 | 201.5 | 131.8 | 186.0 | 77.5 |

TABLE 7

TENSILE STRENGTH (Kg/cm2) OF 2 MIL FILMS AT DIFFERENT COMPOSITION OF POLYOLEFIN

| RESIN | 5% | | 10% | | 15% | | 20% | | 30% | |
|---|---|---|---|---|---|---|---|---|---|---|
| LDPE | MD | TD | MD | TD | MD | TD | MD | TD | MD | TD |
| b | 271.3 | 232.5 | 233.0 | 194.0 | 310.0 | 201.5 | 317.8 | 193.8 | 271.3 | 155.0 |
| d | 240.3 | 224.8 | 302.0 | 217.0 | 333.3 | 178.3 | 294.5 | 178.3 | 217.0 | 100.7 |

TABLE 8

TENSILE STRENGTH (Kg/cm2) OF 2 MIL FILMS AT DIFFERENT COMPOSITION OF POLYOLEFIN

| RESIN | 5% | | 10% | | 15% | | 20% | | 30% | |
|---|---|---|---|---|---|---|---|---|---|---|
| HDPE | MD | TD | MD | TD | MD | TD | MD | TD | MD | TD |
| e | 271.3 | 178.3 | 408.0 | 159.0 | 178.3 | 93.0 | 279.0 | 70.0 | 279.0 | 100.7 |
| g | 294.5 | 224.8 | 430.0 | 190.0 | 232.5 | 85.3 | 155.0 | 73.6 | 178.3 | 70.0 |

TABLE 9

TENSILE STRENGTH (Kg/cm2) OF 2 MIL FILMS AT DIFFERENT COMPOSITION OF POLYOLEFIN

| RESIN | 5% | | 10% | | 15% | | 20% | | 30% | |
|---|---|---|---|---|---|---|---|---|---|---|
| PP | MD | TD | MD | TD | MD | TD | MD | TD | MD | TD |
| h | 294.5 | 201.5 | 384.0 | 229.0 | 286.8 | 224.8 | 317.8 | 193.8 | 294.5 | 186.6 |
| i | 294.5 | 178.0 | 314.0 | 167.0 | 286.8 | 232.5 | 294.5 | 193.8 | 248.0 | 186.0 |
| j | 325.6 | 240.0 | 357.0 | 186.0 | 240.3 | 131.7 | 240.3 | 139.5 | 317.8 | 85.3 |
| k | 310.0 | 201.5 | 322.0 | 167.0 | 255.8 | 178.3 | 209.3 | 147.2 | 186.0 | 124.0 |

EXAMPLES 5–6

Example 1 was repeated except for the following:

Blends of two different LLDPE ( MFI=0.8 and 3.2 ) with styrene-butadiene copolymer K-03 were evaluated at different weight percent ratio keeping antiblock and slip additives constant, no pigments were added to these blends. Shrinking and Tensile strength properties of these samples are reported on table 3 and 7 respectively.

EXAMPLES 7–8

Example 1 was repeated except for the following:

Blends of two different HDPE (MFI=5 and 1 2) with styrene-butadiene copolymer K-03 were evaluated at different weight percent ratio keeping antiblock and slip additives constant, no pigments were added to these blends. Shrinking and Tensile strength properties of these samples are reported on table 4 and 8 respectively.

EXAMPLES 9–12

Example 1 was repeated except for the following:

Blends of four different polypropylenes PP (MFI =1.9, 3, 5 and 9) with styrene-butadiene copolymer K-03 were evaluated at different weight percent ratio keeping antiblock and slip additives constant, no pigments were added to these blends. Shrinking and Tensile strength properties of these samples are reported on table 5 and 9 respectively.

EXAMPLE 13

Example 1 was repeated except for the following:

Styrene-Butadiene copolymer K-03 resin was mixed with 5% of SKRH-10 ( Slip master batch from Shulman) with no polyolefines and antiblock and the shrinking value of 2 mils film at 130° C. for MD was 44% and for TD was 0% and the Tensile strength values were: MD 372 Kg/cm$^2$ and TD 255.8 Kg/cm$^2$.

The films produced by this process were used in the production of labels for glass bottles, achieving labels with an improved visual appearance, less breaking during the printing process and a better retention of the bottle when it breaks, sealability, machinability, optical properties, elongation, shrinking and environmental impact.

By the above, it should be understood that the invention as described in the text and example above, is not limited to the specific conditions and uses and that experts in the field will be trained by the teaching of this invention to produce alterations to the composition of the film and/or its applications that will be included within the true spirit and scope of the invention claimed in the following claims.

I claim:

1. A heat shrinkable thermoplastic film or sheet comprising a block copolymer of styrene-butadiene, wherein the amount of polymerized butadiene units in the copolymer constitutes from about 1 to about 50 weight % of the entire composition, said film or sheet having a tensile strength of about 372 Kg/cm$^2$ in the machine direction and about 255 Kg/cm$^2$ in the transversal direction, and a shrinking value at 130° C. of about 44% for the machine direction and about 0% for the transversal direction.

2. The film or sheet as claimed in claim 1 further comprising polyolefin.

3. The film or sheet as claimed in claim 2 wherein the polyolefin is selected from a group consisting of polyethylene, copolymers of ethylene and vinyl acetate, methyl acrylate, methyl methacrylate, butyl acrylate, acrylic acid and mixtures thereof.

4. The film or sheet as claimed in claim 2 wherein the polyolefin is selected from a group consisting of polypropylene, butadiene elastomer and isoprene.

5. The film or sheet as claimed in claim 1 wherein the amount of polymerized butadiene units is about 20–25% by weight of the entire composition.

6. The film or sheet as claimed in claim 2 wherein the amount of polyolefin is about 0–50 by weight %.

7. The film or sheet as claimed in claim 2 wherein the amount of polyolefin is about 10–15 by weight %.

8. The film or sheet as claimed in claim 2, further comprising additives.

9. The film or sheet as claimed in claim 8 wherein the additives is selected from a group consisting of pigments, antiblocking agents, antistatic agents, lubricants, antioxidants, coloring agents, slip agents, ultraviolet absorbers, fillers and high impact polystyrene.

10. The film or sheet as claimed in claim 4 wherein the polypropylene is selected from a group consisting of polypropylene copolymers, polypropylene terpolymers, linear polypropylene and branched polypropylene.

11. The film or sheet as claimed in claim 4 wherein the butadiene elastomer is selected from a group consisting of butadiene copolymers, linear butadiene and branched butadiene.

12. The film or sheet as claimed in claim 4 wherein the isoprene is selected from a group consisting of isoprene copolymers, linear isoprene and branched isoprene.

13. The film or sheet as claimed in claim 2 wherein the polyolefin is selected from a group consisting of linear low density polyetheylene, high density polyethylene.

14. The film or sheet as claimed in claim 1 produced by extrusion or coextrusion cast process.

15. The film or sheet as claimed in claim 1 wherein the film or sheet is monoaxially or biaxially oriented.

16. The film or sheet as claimed in claim 2 wherein the added polyolefin provides a shrinkage of between 0–50% in the machine or longitudinal direction, 0–10% in the transversal direction at 90° C. to 160° C. temperature on a silicone oil bath for ten seconds.

17. A heat shrinkable thermoplastic film comprising:

a) an effective amount of a block copolymer of styrene-butadiene; wherein the amount of polymerized butadiene units the copolymer constitutes from about 1 to about 50 weight % of the entire composition, said film or sheet having a tensile strength of about 372 Kg/cm$^2$ in the machine direction and about 255 Kg/cm$^2$ in the transversal direction, and a shrinking value at 130° C. of about 44% for the machine direction asked about 0% for the transversal direction;

b) about 0–50% polyethylene; and c) about 0.01–2% additives.

18. A heat shrinkable thermoplastic film or sheet comprising a block copolymer of styrene-butadiene, wherein the amount of polymerized butadiene units in the copolymer constitutes from about 1 to about 50 weight % of the entire composition, said film or sheet having a tensile strength between about 335 and about 409 Kg/cm$^2$ in the machine direction and between about 230 and about 280 Kg/cm$^2$ in the transversal direction and a shrinking value at 130° C. between about 40% and about 48% for the machine direction and between about 0% to about 10% in the transversal direction.

19. A heat shrinkable thermoplastic film or sheet comprising a blend of styrene-butadiene copolymer and polyolefin; wherein the amount of polymerized butadiene units in the copolymer constitutes from about 1 to about 50 weight % of the entire composition, said film or sheet having a tensile strength between about 335 and about 409 Kg/cm$^2$ in the machine direction and between about 230 and about 280 Kg/cm$^2$ in the transversal direction, and having a shrinking value of at 130° C. between about 40% and about 48% for the machine direction and between about 0% to about 10% in the transversal direction.

* * * * *